United States Patent [19]

Hann et al.

[11] Patent Number: 4,517,098
[45] Date of Patent: May 14, 1985

[54] METHOD OF DISPERSING INORGANIC MATERIALS IN AQUEOUS SYSTEMS WITH LOW MOLECULAR WEIGHT ACRYLIC ACID COPOLYMERS

[75] Inventors: William M. Hann, Pennsburg; Jean DuPre, Levittown; John Natoli, Ambler, all of Pa.

[73] Assignee: Rohm and Haas Company, Philadelphia, Pa.

[21] Appl. No.: 485,559

[22] Filed: Apr. 15, 1983

[51] Int. Cl.$^3$ ............................................... C02F 5/10
[52] U.S. Cl. ................................. 210/701; 106/308 Q; 252/180; 501/148
[58] Field of Search ............... 106/308 Q; 209/5; 210/698–701; 252/180, 181; 501/148

[56] References Cited

U.S. PATENT DOCUMENTS

| | | | |
|---|---|---|---|
| 2,783,200 | 2/1957 | Crum et al. | 210/701 |
| 3,699,048 | 10/1972 | Krueger et al. | 210/701 |
| 3,791,978 | 2/1974 | Krueger et al. | 252/180 |
| 4,008,164 | 2/1977 | Watson et al. | 252/180 |
| 4,186,027 | 1/1980 | Bell et al. | 106/308 Q |
| 4,301,266 | 11/1981 | Muenster et al. | 526/212 |
| 4,314,004 | 2/1982 | Stoneberg | 428/421 |
| 4,326,980 | 4/1982 | Snyder et al. | 210/701 |

FOREIGN PATENT DOCUMENTS

| | | | |
|---|---|---|---|
| 53-2393 | 1/1978 | Japan | 252/180 |
| 1414964 | 11/1975 | United Kingdom | |
| 604866 | 4/1978 | U.S.S.R. | 501/148 |

*Primary Examiner*—Peter Hruskoci
*Attorney, Agent, or Firm*—Marc S. Adler

[57] ABSTRACT

A method for dispersing inorganic materials in aqueous systems using water soluble, low molecular weight copolymers of acrylic acid is provided. Copolymers having a weight average molecular weight of from about 2,000 to about 5,000 formed from about 85 to about 97 weight percent acrylic acid and from about 3 to about 15 weight percent of a hydrophobic comonomer are provided for effective dispersion of suspended particulate matter, such as clay, and for inhibiting the precipitation of common hardness ion salts in aqueous systems. The most preferred copolymers have a weight average molecular weight of about 3,000 and are formed from about 95 weight percent acrylic acid and about 5 weight percent ethyl acrylate.

11 Claims, 2 Drawing Figures

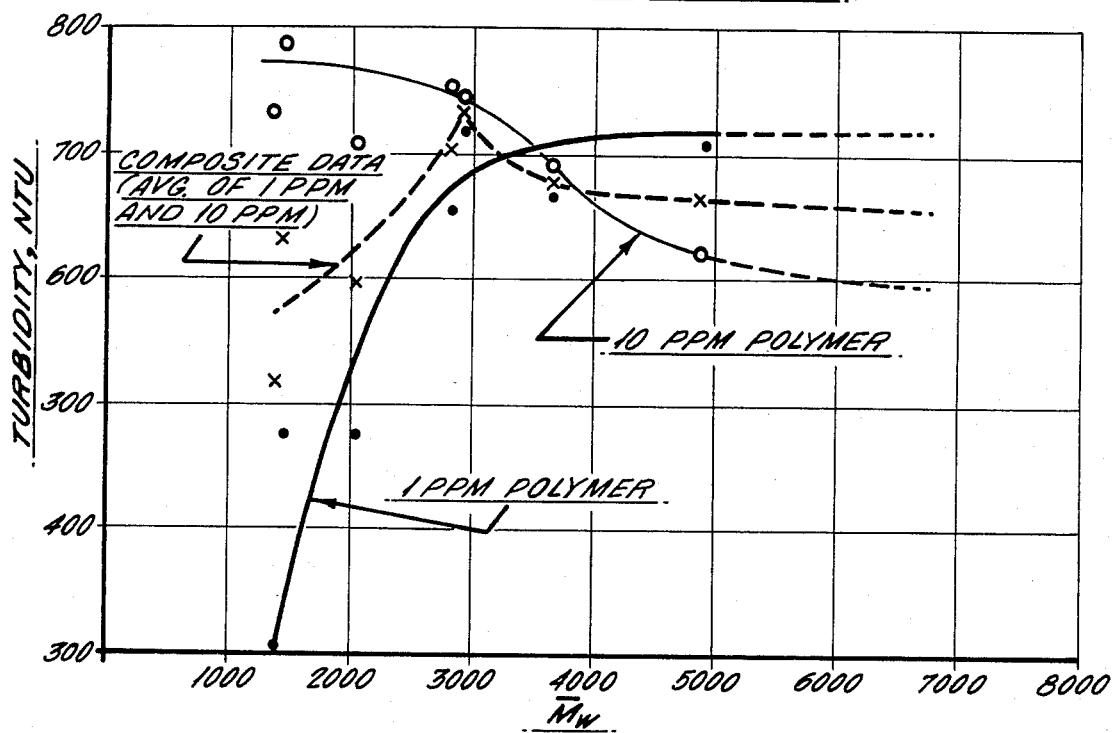
Fig. 2. KAOLIN DISPERSANCY AS A FUNCTION OF $\bar{M}_w$ (AA/EA COPOLYMERS, 1 EA/CHAIN)
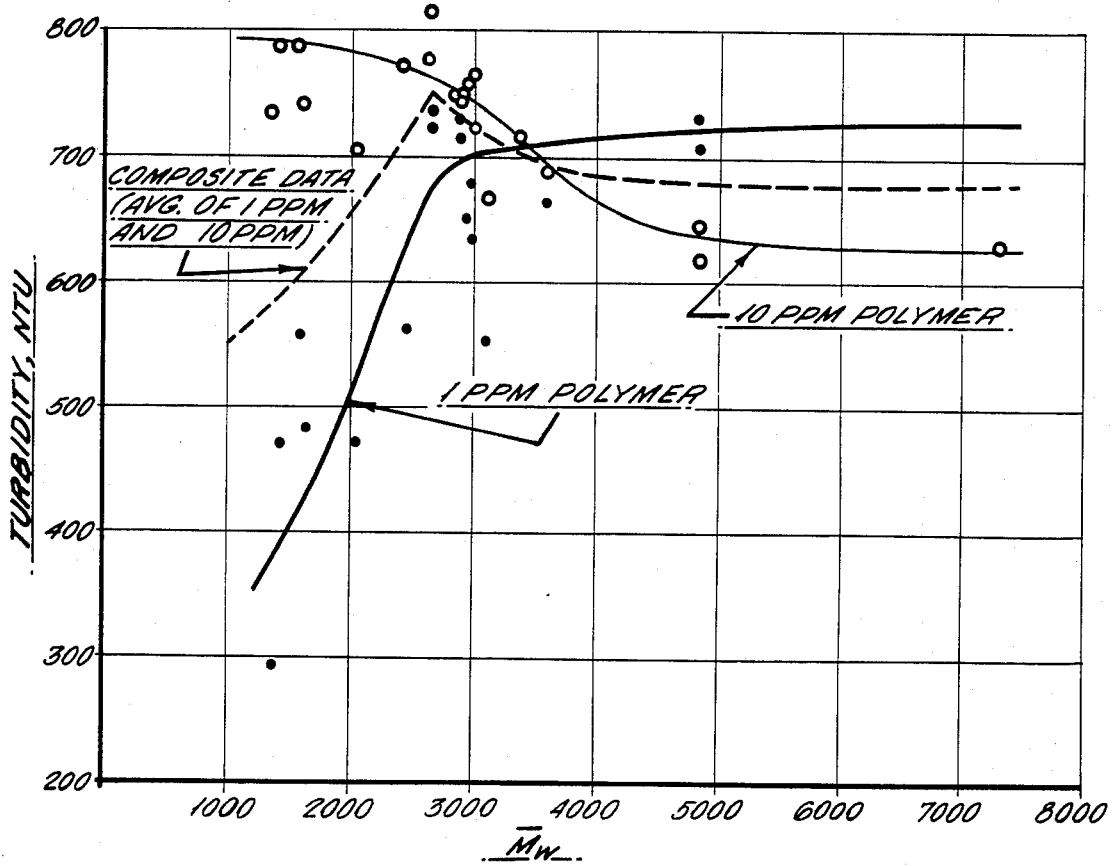
Fig. 1. KAOLIN DISPERSANCY AS A FUNCTION OF MOLECULAR WEIGHT AA/(METH) ACRYLATE ESTER COPOLYMERS

METHOD OF DISPERSING INORGANIC MATERIALS IN AQUEOUS SYSTEMS WITH LOW MOLECULAR WEIGHT ACRYLIC ACID COPOLYMERS

BACKGROUND OF THE INVENTION

Field of the Invention

This invention relates to the use of water soluble, low molecular weight copolymers of acrylic acid to disperse inorganic particulate matter and to inhibit the precipitation of common hardness ion salts in aqueous systems. More particularly, the invention relates to the use of certain copolymers, having a weight average molecular weight of from about 2,000 to about 5,000 formed from about 85 weight percent to about 97 weight percent acrylic acid monomer and from about 3 weight percent to about 15 weight percent of a hydrophobic monomer, to disperse suspended inorganic particulate matter and to inhibit the precipitation of hardness ion salts in aqueous systems.

Much of the water used in recirculating cooling water systems and water cooled industrial heat exchangers supplied from rivers, lakes, ponds and the like contains high concentrations of suspended inorganic particulate materials such as mud, silt and clay. In cooling tower systems, the cooling effect is achieved by evaporating a portion of the water circulating through the tower. This evaporating results in the concentration of the suspended materials in the water. These materials settle in locations of low flow rates and cause corrosion, frictional losses and inefficient heat transfer.

Water used in cooling systems and water-cooled heat exchangers also contains dissolved salts of hardness ions, such as calcium and magnesium. These salts can precipitate from solution and lead to the formation of scale on the heating surfaces of the cooling systems or exchangers. The most common deposit found in cooling water systems is calcium carbonate. Calcium carbonate has a relatively low solubility in water. This solubility decreases with increasing pH, temperature and concentration. Calcium sulfate is also likely to be encountered in cooling water systems. Calcium sulfate may result from the addition of sulfuric acid to raw water to control calcium carbonate scale. While calcium sulfate is more soluble than calcium carbonate, the solubility limit of calcium sulfate can also be easily exceeded resulting in its precipitation from solution.

High molecular weight polyacrylates and polyacrylamides have been used to agglomerate fine particles of mud and silt into a loose floc to reduce the accumulation of these materials in pipes and heat exchanger tubes. However, these flocs tend to settle in cooling tower basins which then require frequent cleaning for their removal.

Many other compounds have been developed and are being used with varying degrees of success to disperse suspended particulate matter and to inhibit the precipitation of hardness ion salts and the resultant formation of scale in aqueous systems.

PRIOR ART

U.S. Pat. No. 2,783,200 is directed to a process for conditioning sludge or precipitates in boiler feed water by adding polyacrylic acid or polymethacrylic acid with, and without, inorganic phosphates. Copolymers of sodium polyacrylate and polymethacrylate, having undisclosed compositions and high molecular weights, are disclosed as being as effective as sodium polyacrylate homopolymer to treat internal boiler water.

U.S. Pat. No. 3,085,916 relates to a method for removing mud and silt from cooling water by using high molecular weight (greater than 100,000) polymers of acrylic acid or methacrylic acid, their salts, or copolymers formed from at least 50 mole percent acrylic or methacrylic acid with other copolymerizable monomers. High, rather than low, molecular weight copolymers are taught as being generally more effective as mud and silt flocculants. The patent is silent, however, on the use of low molecular weight acrylic polymers or copolymers as dispersants for mud and silt in aqueous systems.

U.S. Pat. No. 3,578,589 is directed to a method for treating cooling water deposits using a nonionic surfactant and acrylic acid or methacrylic acid polymers, salts thereof and copolymers of such salts. The molecular weight of the copolymers is disclosed as ranging from about 4,000 to about 95,000 while the preferred polymethacrylic acid or sodium polymethacrylate is disclosed as having a molecular weight ranging from 5,000 to 15,000.

U.S. Pat. No. 4,008,164 relates to inhibiting calcium deposits in water using copolymers of acrylic acid and low levels of methylacrylate where the copolymer has a molecular weight ranging from 3,000 to 20,000 and preferably 6,000 to 8,000. A molar excess of acrylic acid to methylacrylate of at least 3:1 and preferably 4:1 to 5:1 is required. The preferred copolymer has a molecular weight ranging from 6,000 to 8,000.

Canadian Pat. No. 1,097,555 also relates to a process for inhibiting calcium sulfate, calcium carbonate and barium sulfate scale by the addition of copolymers of acrylic acid having molecular weights ranging from 1,000 to 25,000 and preferably 6,000 to 8,000. A molar excess of at least 3:1 and preferably 4:1 to 5:1 acrylic acid to methacrylic acid is disclosed.

U.S. Pat. No. 4,029,577 is directed to a process for controlling the formation of scale and/or suspended solid matter in aqueous systems by introducing copolymers of acrylic acid or a water-soluble salt thereof, and hydroxy lower alkyl ($C_2$–$C_6$) acrylate moieties, or water soluble salts thereof, in a molar ratio of about 34:1 to about 1:4. The copolymers disclosed have molecular weights ranging from 500 to 1,000,000.

Other references relating to methods of treating water with polyacrylic acid-containing additives include: U.S. Pat. Nos. 3,293,152; 3,579,455; 3,663,448; 3,699,048; 3,766,077; 4,004,939; 4,209,398; 4,303,568; 4,326,980; Canadiant Pat. No. 1,057,943; and German Offeng. No. 2,344,498.

None of the above references disclose or suggest that low molecular weight, less than about 5,000 weight average molecular weight, copolymers of acrylic acid and certain hydrophobic comonomers can effectively disperse inorganic particulate matter or inhibit the precipitation of common hardness ion salts in aqueous systems.

SUMMARY OF THE INVENTION

We have unexpectedly found that inorganic particulate matter can be effectively dispersed in aqueous systems by the introduction of water soluble, copolymers of acrylic acid and selected hydrophobic comonomers where the molecular weight of the copolymer ranges from about 2,000 to about 5,000 weight average molecular weight.

In addition, we have found that low molecular weight copolymers formed from about 85 weight percent to about 97 weight percent acrylic acid and from about 3 weight percent to about 15 weight percent of a hydrophobic comonomer, such as a lower alkyl ($C_2$–$C_8$) acrylate or ($C_1$–$C_8$) methacrylate or a vinyl aromatic compound, are superior dispersants for inorganic particulates and effective anti-precipitant scale inhibitors for common hardness ion salts in aqueous systems. Products available heretofore possessing high anti-precipitant activity have generally been deficient in their ability to disperse particulate matter.

BRIEF DESCRIPTION OF THE DRAWINGS

FIG. 1 presents a graphical illustration of the kaolin dispersancy of the acrylic acid-hydrophobic copolymers as a function of their weight average molecular weight.

FIG. 2 presents a graphical illustration of the kaolin dispersancy of acrylic acid-ethyl acrylate copolymers, having about one unit of ethyl acrylate per chain of acrylic acid, as a function of their weight average molecular weight.

DETAILED DESCRIPTION OF THE INVENTION

The method of the present invention requires the addition of low molecular weight, water soluble, copolymers of acrylic acid and certain hydrophobic comonomers to aqueous systems containing suspended inorganic particulate materials and/or common hardness ion salts. The hydrophobic comonomers found to be useful in the preparation of the copolymers of this method include lower alkyl acrylates, having 2 to 8 carbon atoms in the alkyl group, and methacrylates, having 1 to 8 carbon atoms in the alkyl group, such as ethyl and butyl acrylate, methyl methacrylate and ethyl methacrylate, and vinyl aromatic monomers such as styrene and alkyl substituted styrene, as well as copolymers formed from mixtures of these hydrophobic comonomers with acrylic acid. These comonomers must be copolymerizable with and soluble in acrylic acid monomer or a mutual solvent.

COPOLYMER SYNTHESIS

In general, the prior art discloses several suitable synthesis methods for preparing low molecular weight copolymers of acrylic acid.

U.S. Pat. No. 4,314,004 is directed to one suitable copolymer synthesis method and the disclosure thereof is incorporated herein by reference. This method requires a specific concentration range of a copolymerization initiator and a specific molar ratio range of the initiator concentration and the concentration of certain metal salts to obtain the desired low molecular weight copolymers useful in the present invention. The preferred copolymerization initiators are peroxide compounds such as ammonium persulfate, potassium persulfate, hydrogen peroxide and t-butyl hydroperoxide. The preferred concentration range of the initiator is between about 1 to about 20 weight percent based on the weight of monomers. The metal salts used to regulate molecular weight preferably include cuprous and cupric chloride or bromide, cupric sulfate, cupric acetate, ferrous and ferric chloride, ferrous sulfate and ferric and ferrous phosphate. The molar ratio of the copolymerization initiator to the metal salt is preferably between about 40:1 to about 80:1. The copolymers of acrylic acid useful in this invention are preferably prepared in water at a copolymer concentration of about 40 to about 50 percent based on total weight of solution.

Another method useful to prepare these low molecular weight copolymers is described in U.S. Pat. No. 4,301,266, the disclosure thereof also being incorporated herein by reference. In this process isopropanol is used as the molecular weight regulator as well as the reaction solvent. The reaction solvent may also be an aqueous mixture of isopropanol containing at least 40 weight percent isopropanol. The copolymerization initiator is a free radical initiator such as hydrogen peroxide, sodium persulfate, potassium persulfate, or benzoyl peroxide. The copolymerization is carried out under pressure at a temperature of 120° to 200° C. The concentration of the copolymer in the solvent is preferably 25 to 45 percent based on the weight of the total solution. When copolymerization is complete, the isopropanol is distilled from the reactor and the copolymer may be neutralized with a base.

Still another method for preparing low molecular weight copolymers useful in this invention is described in U.S. Pat. No. 3,646,099, the disclosure thereof also being incorporated herein by reference. This process is directed to the preparation of cyano-containing oligomers; however, it is also applicable for preparing low molecular weight copolymers useful in the present invention. This process employs a bisulfite salt as the copolymerization molecular weight regulator and the resulting copolymers prepared thereby are sulfonate terminated. The preferred bisulfite salt is sodium bisulfite at a concentration of between 5 and 20 weight percent based on the weight of monomers. The free radical copolymerization initiator is ammonium, sodium or potassium persulfate, hydrogen peroxide or t-butyl hydroperoxide. The preferred concentration of the initiator is between 0.2 and 10 weight percent based on monomers. The polymerization temperature is preferably between 20° and 65° C. and the concentration of the copolymers in the aqueous solvent is between 25 and 55 weight percent based on total solution weight.

EVALUATION OF COPOLYMERS

A number of copolymers were prepared from about 80 weight percent to about 99 weight percent acrylic acid monomer and from about one weight percent to about 20 weight percent hydrophobic comonomer. The weight average molecular weight of the copolymers was varied from about 1,350 to about 8,000 based on polyacrylic acid polymer standards as determined by standard aqueous gel permeation chromatographic techniques. For each copolymer type prepared, the number of comonomer units per acrylic acid polymer chain was calculated. As the weight average molecular weight of the copolymer is decreased, the number of polymer chains per gram of polymer solids increases.

TABLE I

COMPOSITION OF ACRYLIC ACID/HYDROPHOBE COPOLYMERS

| Example | Wt. % AA[1] | Hydrophobic Comonomer Type[1] | Wt. % | Average No. Per Chain | Copolymer Mw[2] |
|---|---|---|---|---|---|
| 1 | 98.1 | EA | 1.3 | 0.2 | 3110 |
| 2 | 97.6 | EA | 2.4 | 0.3 | 1630 |
| 3 | 96.0 | EA | 4.0 | 0.8 | 3010 |

TABLE I-continued
COMPOSITION OF ACRYLIC ACID/HYDROPHOBE COPOLYMERS

| Example | Wt. % AA[1] | Hydrophobic Comonomer Type[1] | Wt. % | Average No. Per Chain | Copolymer $\overline{Mw}$[2] |
|---|---|---|---|---|---|
| 4 | 92.8 | EA | 7.2 | 0.8 | 1570 |
| 5 | 96.0 | EA | 4.0 | 1.0 | 4860 |
| 6 | 95.3 | EA | 4.7 | 1.0 | 3610 |
| 7 | 94.7 | EA | 5.3 | 1.0 | 2910 |
| 8 | 92.8 | EA | 7.2 | 1.0 | 2980 |
| 9 | 92.2 | EA | 7.8 | 1.0 | 2040 |
| 10 | 87.7 | EA | 12.3 | 1.0 | 1360 |
| 11 | 85.0 | EA | 15.0 | 1.0 | 1430 |
| 12 | 90.6 | EA | 9.4 | 2.0 | 3410 |
| 13 | 89.4 | EA | 10.6 | 2.0 | 3010 |
| 14 | 85.6 | EA | 14.4 | 2.0 | 2650 |
| 15 | 98.7 | BA | 1.3 | 0.14 | 2180 |
| 16 | 98.2 | BA | 1.8 | 0.3 | 4820 |
| 17 | 96.7 | BA | 3.3 | 0.3 | 2440 |
| 18 | 94.9 | BA | 5.1 | 1.0 | 7340 |
| 19 | 90.8 | BA | 9.2 | 1.0 | 2670 |
| 20 | 88.5 | BA | 11.5 | 1.25 | 2940 |
| 21 | 98.7 | MMA | 1.3 | 0.14 | 2040 |
| 22 | 98.2 | MMA | 1.8 | 0.4 | 5280 |
| 23 | 91.8 | EMA | 8.2 | 1.0 | 2890 |
| 24 | 92.5 | S | 7.5 | 1.0 | 5140 |

[1]AA = acrylic acid; EA = ethyl acrylate; BA = butyl acrylate; MMA = methyl methacrylate; EMA = ethyl methacrylate; S = styrene
[2]$\overline{Mw}$ means weight average molecular weight as determined based on polyacrylic acid standards using standard gel permeation chromotographic techniques.

The copolymers were then evaluated for their ability to disperse a common inorganic particulate material according to the following test method.

KAOLIN DISPERANCY SCREENING TEST

To a blender was added 500 ml. of 200 ppm Ca$^{+2}$ (as calcium carbonate) hard water and 0.50 grams of Ansilex® X-1846A kaolin, manufactured by Engelhard Minerals and Chemicals, Inc. (93% having a particle diameter less than 2 microns). The copolymer was then added to the blender. The concentration of the copolymers utilized was 1, 5, 10, and 30 ppm. The blender was then operated at low speed for one minute. The pH was then adjusted to 7.5 with sodium hydroxide. The dispersion was then poured into a 100 ml. graduated cylinder and was allowed to stand undisturbed for 2 hours. 20 ml. of the dispersion was then removed from the top of the cylinder and placed in a HF model DRT 100D turbidimeter. Turbidity was then determined in nephelometric turbidity units (NTU). High NTU's, on the order of about 700, indicate good dispersancy. The turbidity of each sample was determined, and repeated at least twice, using a fresh test sample for each repeat test. The average NTU values for each Example 1–24 are presented in Table II. The dispersancy of the copolymers as a function of weight average molecular weight is illustrated in FIG. 1. The results show that at a one ppm. copolymer concentration dispersancy drops off sharply at below 2,500 weight average molecular weight ($\overline{Mw}$). At 10 ppm copolymer concentration, a gradual drop off in performance occurs as the $\overline{Mw}$ is increased above 3,000.

TABLE II
KAOLIN DISPERSANCY SCREENING OF AA[1] HYDROPHOBE COPOLYMERS

| Example | Hydrophobic Monomer Type | Wt. % | Copolymer $\overline{Mw}$[2] | Avg. Kaolin Dispersancy NTU 1 ppm | 10 ppm |
|---|---|---|---|---|---|
| Control | No polymer | | | 145 | — |
| 1 | EA[1] | 1.3 | 3110 | 558 | 666 |
| 2 | EA | 2.4 | 1630 | 489 | 741 |
| 3 | EA | 4.0 | 3010 | 680 | 763 |
| 4 | EA | 7.2 | 1570 | 561 | 785 |
| 5 | EA | 4.0 | 4860 | 704 | 621 |
| 6 | EA | 4.7 | 3610 | 664 | 688 |
| 7 | EA | 5.3 | 2910 | 716 | 745 |
| 8 | EA | 7.2 | 2980 | 652 | 753 |
| 9 | EA | 7.8 | 2040 | 478 | 708 |
| 10 | EA | 12.3 | 1360 | 294 | 733 |
| 11 | EA | 15.0 | 1430 | 474 | 787 |
| 12 | EA | 9.4 | 3410 | 709 | 714 |
| 13 | EA | 10.6 | 3010 | 639 | 721 |
| 14 | EA | 14.4 | 2650 | 736 | 776 |
| 15 | BA[1] | 1.3 | 2180 | — | 758, 220[3] |
| 16 | BA | 1.8 | 4820 | 730 | 648 |
| 17 | BA | 3.3 | 2440 | 566 | 771 |
| 18 | BA | 5.1 | 7340 | 724 | 633 |
| 19 | BA | 9.2 | 2670 | 720 | 812 |
| 20 | BA | 11.5 | 2940 | 697 | 749 |
| 21 | MMA[1] | 1.3 | 2040 | — | 482 |
| 22 | MMA | 1.8 | 5280 | — | 581 |
| 23 | EMA[1] | 8.2 | 2890 | 730 | 749 |
| 24 | S[1] | 7.5 | 5140 | 743 | 730 |

[1]AA = acrylic acid; EA = ethyl acrylate; BA = butyl acrylate; MMA = methylmethacrylate; EMA = ethyl methacrylate; and S = styrene
[2]$\overline{Mw}$ = Weight average molecular weight, polyacrylic acid as standard
[3]220 inaccurate test result. Repetition showed 758 NTU.

FIG. 2 illustrates the dispersancy of the acrylic acid-/ethyl acrylate copolymers (Examples 5–11) formed from one unit of ethyl acrylate per chain of acrylic acid. This Figure shows the same drop off in dispersancy at one ppm. copolymer concentration with copolymers having $\overline{Mw}$ below about 2,500. The composite of dispersancy for the 1 ppm. and 10 ppm. copolymer concentrations shows that a maximum dispersancy occurs at about 3,000 $\overline{Mw}$ which corresponds to the preferred copolymer composition of about 95 weight percent acrylic acid and about 5 weight percent ethyl acrylate. It is believed that the incorporation of about one unit of hydrophobic comonomer per chain of acrylic acid results in a copolymer having preferred performance as compared to other ratios of hydrophobic comonomer units per chain.

This test method was repeated utilizing various conventional polymers and copolymers for comparison. The compositions of these copolymers and their kaolin dispersancy is presented in Table III. Full dispersancy (approximately 750 NTU) is capable of being achieved with low molecular weight (1000 $\overline{Mw}$) polyacrylic acid (Example 26) at concentrations of 10 ppm. and above. However, dispersancy drops off dramatically at low concentration (1 ppm of the homopolymer). Higher molecular weight ($\overline{Mw}$ 2,200–4,700) polyacrylic polymers (Examples 32, 33, 34, 36, and 37) prepared using a peroxy type initiator and isopropanol gave good dispersancy at both high and low concentrations. A copolymer of polyacrylic acid and hydroxypropyl acrylate (Example 39) ($\overline{Mw}$ 3,200) also gave good dispersancy at both high and low concentrations.

TABLE III
KAOLIN DISPERSANCY SCREENING
OF CONVENTIONAL ADDITIVES

| Example | Monomers | Copolymer Composition Wt. % | $\overline{Mw}$ | Kaolin Dispersancy, NTU | | | |
|---|---|---|---|---|---|---|---|
| | | | | 1 ppm | 5 ppm | 10 ppm | 30 ppm |
| 25 | Acrylic Acid | 100 | 600 | — | — | 422 | — |
| 26 | Acrylic Acid | 100 | 1120 | 254 | 597 | 759 | 767 |
| 27 | Acrylic Acid | 100 | 2200 | 616 | 640 | 572 | — |
| 28 | Acrylic Acid | 100 | 5140 | 624 | 419 | 323 | 260 |
| 29 | Acrylic Acid | 100 | 3000 | 553 | 280 | 250 | — |
| 30 | AMP[1] | 100 | — | 200 | — | 236 | — |
| 31 | HEDP[2] | 100 | — | 185 | — | 131 | — |
| 32 | Acrylic Acid[3] | 100 | 2200 | 682 | 771 | 819 | 807 |
| 33 | Acrylic Acid[3] | 100 | 4700 | 742 | 751 | 764 | — |
| 34 | Acrylic Acid[3] | 100 | 4500 | 762 | — | 751 | — |
| 35 | Acrylic Acid[4] | 100 | 4300 | 702 | — | 494 | — |
| 36 | Acrylic Acid | 100 | — | 565 | — | 781 | — |
| 37 | Acrylic Acid[3] | 100 | 2100 | — | — | 788 | — |
| 38 | Acrylic Acid/ Arylamide | 92/8 | 2300 | 592 | — | 744 | — |
| 39 | Acrylic Acid/ HPA[5] | 62/68 | 3200 | 775 | — | 799 | — |
| 40 | Na+ Styrene Sulfonate/ Na+ Maleate | 80/20 | — | 578 | — | 775 | — |

[1]AMP — aminotrismethylene phosphonic acid
[2]HEDP — 1-hydroxyethylidene-1,1-diphosphonic acid
[3]Polymerized using peroxy-type initiator and isopropanol as chain transfer agent and solvent
[4]Polymerized using sodium hypophosphite/H$_2$O$_2$/TEA/Cu/Fe initiator system
[5]HPA — hydroxypropyl acrylate The results of the kaolin screening tests, described above, were then compared with another kaolin dispersancy test as described in U.S. Pat. No. 4,326,980 for the preferred acrylic acid/ethyl acrylate copolymer (Example 7) and the comparative polyacrylic homopolymers of Examples 27 and 33. This test procedure was performed as follows: To a blender was added 500 ml. of 200 ppm. Ca$^{+2}$ (as calcium carbonate) solution and 0.5 Hydrite ® UF kaolin. The solution was blended for five minutes. The pH was then adjusted to 7.5 with sodium hydroxide while the solution was constantly stirred. The solution was then blended again for one minute. A 90 ml. aliquot of the solution was placed in a 4 oz. bottle and diluted to 100 ml. with deionized water. After two 4 oz. bottles were prepared, the remaining solution was re-blended for less than 1 minute. The sample polymers were then added to the bottle at concentrations of 0.5, 1, 2, and 3 ppm. The bottle was then capped, inverted about 5 times and placed on a shaker for 15 minutes. The bottle was then allowed to stand for 18 hours. The top 25 ml. of the bottle was pipetted into a 1 oz. vial and the percent transmittance of light was measured at 415 nm. The Δ percent T is calculated as follows:

$$\Delta \% T = \% T(\text{control, no polymer}) - \% T(\text{treated})$$

The results of this test are presented on Table IV.

TABLE IV

| KAOLIN DISPERSANT ACTIVITY Δ % T | | | |
|---|---|---|---|
| | Polymer Concentration, ppm | | |
| Example | 5 | 10 | 20 |
| 7 | 20 | 38 | 45 |
| 27 | 13 | 31 | 41 |
| 33 | 19 | 37 | 47 |

The results at 10 ppm. confirm the screening test results presented in Tables II and III. The preferred copolymer of this invention (Example 7) was found to be equivalent to the high molecular weight homopolyer (Example 33) and much better than the low molecular weight homopolymer (Example 27) at 10 ppm. At 5 ppm. and 20 ppm., the copolymer of Example 7 was also better than the low molecular weight homopolymer (Example 27) and about equivalent to the higher molecular weight homopolymer (Example 33).

The anti-precipitation activity of the preferred acrylic acid-ethyl acrylate copolymer for common hardness ion salts was also evaluated and compared with an effective dispersant high $\overline{Mw}$ homopolyacrylic acid polymer (Example 33) and the best dispersant low $\overline{Mw}$ polyacrylic acid (Example 27). The test methods used to determine calcium sulfate and calcium carbonate precipitation inhibition are also disclosed in U.S. Pat. No. 4,326,980.

CALCIUM SULFATE ANTIPRECIPITATION TEST

Two stock solutions (A and B) were prepared. Stock Solution A contained 11.1 grams/liter calcium chloride adjusted to pH 7.0. Stock Solution B contained 14.2 grams/liter sodium sulfate adjusted to pH 7.0.

To a 4 oz. jar was added 50 ml. stock solution A and either 0, 0.5, 1 or 2 ppm. of polymer and 50 ml. of stock Solution B. The jar was heated in an oven at 50° C. for 24 hours and was then cooled for one-half hour. The cooled sample was then filtered through a 0.45 micron filter. Five ml. of the filtrate was diluted to 50 ml. with deionized water. Two drops of 50% NaOH was then added followed by a Ca$^{+2}$ indicator. The solution was then titrated with EDTA to a purple-violet end point. The percent calcium sulfate inhibition was calculated as follows:

$$\% \text{ CaSO}_4 \text{ inhibition} = \frac{\text{mls titrant (treated)} - \text{mls (no polymer)}}{\frac{\text{mls}}{2}(\text{Ca}^{+2}/\text{Stock Solution A}) - \text{mls (no polymer)}} \times 100\%$$

CALCIUM CARBONATE ANTI-PRECIPITATION TEST

Two Stock Solutions (C and D) were prepared. Stock Solution C contained 2.45 g/l calcium chloride adjusted to pH 8.5. Stock Solution D contained 2.48 g/l Na$_2$CO$_3$ adjusted to pH 8.5.

To a 4 oz. jar was added 50 ml of Stock Solution C, 0, 2.5, 5, or 10 ppm polymer, and 50 ml of Stock Solution D. The sample jar was preheated in a warm water bath at about 70° C. for 5 minutes. The preheated sample was then heated at 70° C. in an oven for 5 hours. The sample was then removed from the oven and cooled to room temperature. The cooled sample was then filtered through a 0.2 micron filter. To 25 ml of filtrate was added 4 ml of concentrated hydrochloric acid. The sample was then allowed to stand for at least 15 minutes. The sample was then diluted to 50 ml with deionized water and then 3 ml of 50% sodium hydroxide was added followed by $Ca^{+2}$ indicator. The solution was then titrated with EDTA to a purple-violet end point and the calcium carbonate inhibition was calculated as follows:

$$\% \text{ CaCO}_3 \text{ inhibition} = \frac{\text{mls titrant (treated)} - \text{mls (no polymer)}}{\frac{\text{mls}}{2} (Ca^{+2}/\text{Stock Solution C}) - \text{mls (no polymer)}} \times 100\%$$

The results of the calcium sulfate and calcium carbonate precipitation inhibition tests are presented in Table V. The preferred acrylic acid-ethylacrylate copolymer performed better than both polyacrylic acid samples at low concentrations and equivalently at high concentrations for both calcium sulfate and calcium carbonate precipitation inhibition.

TABLE V

AVERAGE ANTIPRECIPITATION ACTIVITY, % INHIBITION

| | % Calcium Sulfate Inhibition Polymer concentration, ppm | | | % Calcium Carbonate Inhibition Polymer concentration, ppm | | |
|---|---|---|---|---|---|---|
| Polymer | 0.5 | 1.0 | 2.0 | 1.0 | 2.5 | 5.0 |
| Example 7 | 45 | 71 | 96 | 70 | 72 | 83 |
| Example 27 | 39 | — | 95 | 67 | 81 | 80 |
| Example 33 | 15 | 33 | 92 | 57 | 69 | 83 |

Accordingly, the copolymers of this invention exhibit effective dispersancy for inorganic particulate matter and precipitation inhibition for common hardness ion salts in aqueous systems.

The anti-precipitation activity of a number of the other low molecular weight acrylic acid copolymers was also evaluated using the calcium sulfate test described above. The results of the test at 1 ppm copolymer solids concentration are presented in Table VI.

TABLE VI

CALCIUM SULFATE ANTI-PRECIPITATION INHIBITION, % INHIBITION

| | Hydrophobic Monomer | | | % CaSO$_4$ |
|---|---|---|---|---|
| Example | Type | Average Number/Chain | Copolymer Mw | Inhibition 1 ppm |
| 5 | EA | 1 | 4860 | 87 |
| 6 | EA | 1 | 3610 | 93 |
| 7 | EA | 1 | 2910 | 97[1] |
| 9 | EA | 1 | 2040 | 100 |
| 10 | EA | 1 | 1360 | 68 |
| 11 | EA | 1 | 1430 | 75 |
| 14 | EA | 2 | 2650 | 100 |
| 18 | BA | 1 | 7340 | 82 |
| 19 | BA | 1 | 2670 | 96 |
| 23 | EMA | 1 | 2890 | 90 |
| 24 | Styrene | 1 | 5140 | 36 |

[1]Temperature lower than Example 7, Table V.

The test results demonstrate the drop-off in anti-precipitation activity of the acrylic acid copolymers having weight average molecular weights less than about 2500 and greater than about 5000.

I have also found that low molecular weight copolymers of acrylic acid and hydrophobic monomers are effective dispersants for concentrated slurries of calcium carbonate and kaolin clay. Kaolin clay and calcium carbonate are used as fillers in plastics, rubbers, and paper, as pigments for paint and rubber, and as paper coatings to provide brightness and gloss. In many applications, and in particular paper coating applications, kaolin clays and calcium carbonate are shipped, stored, and applied as high solids content aqueous slurries. The clay slurries typically contain about 60 to 70% clay solids. The particle size of the kaolin clays in the slurries is usually about 2 microns or less in diameter. The calcium carbonate slurries typically contain about 60 to 75% or more calcium carbonate solids. For handling purposes it is important that the slurry viscosity be as low as possible to permit pumping and spraying of the slurry and to permit the slurry to flow after extended storage.

The cost to manufacture and the concentration of the dispersant in the slurry should be as low as possible to effectively and economically reduce the viscosity of the slurry to manageable levels. The viscosity of the slurry without the addition of a dispersant would be in the excess of 50,000 centipoise. Low molecular weight polyacrylic acid polymers are effective as dispersants for such slurries. The effectiveness of the preferred acrylic acid-ethylacrylate copolymer formed from about 95 weight percent acrylic acid and about 5 weight percent ethyl acrylate, having a weight average molecular weight of about 3000, was evaluated and compared with conventional polyacrylic acid polymers as dispersants for concentrated slurries according to the following test procedures.

CALCIUM CARBONATE SLURRY DISPERSION TEST

Into a 1 liter stainless steel mixing cup was added 1.88 grams of 10% dispersant polymer or copolymer solution (pH approximately 7.0) and 123.12 grams of deionized water. 375 grams of Snowflake White calcium carbonate, manufactured by Thompson Weinman & Company, was added to the mixing cup to form a slurry. The slurry was then mixed for 15 minutes. A 450 gram aliquot of the slurry was removed from the cup and placed into a one-pint jar. The jar was capped and shaken gently until the slurry cooled to room temperature. The pH and viscosity of the slurry was then measured using a Brookfield RV viscometer at 20 rpm. Following this, the dispersant concentration was raised by 0.025 weight percent while keeping the calcium carbonate solids concentration at 75% by adding 0.84 grams of the 10% dispersant solution and 0.63 grams of calcium carbonate to the slurry in the pint jar. The new slurry was mixed for 2 minutes and the viscosity was measured. This was repeated until a 0.100 weight percent dispersant containing slurry was formed and measured. The results of this test are presented in Table VII.

TABLE VII

| CALCIUM CARBONATE SLURRY DISPERSION TEST | | | |
|---|---|---|---|
| Polymer Concentration | Brookfield Viscosity (cps) at 20 RPM | | |
| (Wt. % Based on CaCO$_3$) | PAA[1] | PAA[2] | AA/EA[3] |
| 0.050 | 5250 | 3045 | 3675 |
| 0.075 | 600 | 300 | 583 |

TABLE VII-continued

| CALCIUM CARBONATE SLURRY DISPERSION TEST | | | |
|---|---|---|---|
| Polymer Concentration | Brookfield Viscosity (cps) at 20 RPM | | |
| (Wt. % Based on CaCO₃) | PAA[1] | PAA[2] | AA/EA[3] |
| 0.100 | 390 | 230 | 430 |
| pH | 9.2 | 9.22 | 9.10 |

[1]PAA is polyacrylic acid having $M_w$ 3300 and $M_n$ 1600.
[2]PAA is DISPEX N-40 polyacrylic acid, manufactured by Allied Colloids, Ltd., having a Mw of 3300 and a Mn of 2200.
[3]AA/EA is a copolymer of AA (acrylic acid)/EA (ethyl acrylate) (95 weight percent AA, 5 weight percent EA), Mw of 3000 and Mn 1700.

The table illustrates that the preferred acrylic acid-ethyl acrylate copolymer is an effective dispersant for high solids content calcium carbonate slurries.

KAOLIN SLURRY DISPERSION TEST

Into a 1 liter stainless steel mixing cup was added 6.13 grams of a 10% solution of the dispersant polymer or copolymer (pH approximately 7.0), 4.66 grams of 20% Na₂CO₃ solution and a 50/50 mixture of deionized and tap water to bring the aqueous solution to 210 grams. To the solution was added 490 grams of Astra Glaze ® kaolin clay, manufactured by Georgia Kaolin Company, with low speed mixing, to form a slurry. The slurry was then mixed for 15 minutes at high speed. A 500 gram aliquot of the slurry was then removed from the mixing cup and placed into a pint jar. The jar was capped and shaken gently until the slurry cooled to room temperature. The pH and viscosity (Brookfield RV viscometer at 20 rpm) was then measured. Following this, the concentration of the dispersant was increased by 0.025 weight percent while keeping the concentration of the clay solids constant at 70% by adding 0.88 grams of the 10% dispersant solution and 2.05 grams of kaolin to the slurry in the pint jar. The new slurry was mixed for 2 minutes and the viscosity of the slurry was remeasured. This was repeated until the level of dispersant in the slurry was 0.200 weight percent based on kaolin. The results are provided in Table VIII.

TABLE VIII

| KAOLIN SLURRY DISPERSION TEST | | | | | |
|---|---|---|---|---|---|
| Polymer Concentration (Wt. % Based | Brookfield Viscosity (cps) at 20 RPM | | | | |
| on Kaolin) | PAA[1] | PAA[2] | PAA[3] | PAA[4] | AA/EA[5] |
| 0.125 | 738 | 580 | 430 | 476 | 297 |
| 0.150 | 318 | 500 | 281 | 292 | 276 |
| 0.175 | 310 | 370 | 284 | 281 | 278 |
| 0.200 | 355 | 340 | 311 | 328 | 310 |

[1]PAA is polyacrylic acid polymer having $M_w$ 4200, $M_n$ 2600.
[2]PAA is polyacrylic acid polymer having Mw 3000, Mn 1600.
[3]PAA is DISPEX N-40, polyacrylic acid polymer manufactured by Allied Colloids, Ltd. having Mw 3300, Mn 2200.
[4]PAA is Colloid 211 polyacrylic acid polymer manufactured by Colloids, Inc., having Mw 3300 and Mn 2200.
[5]AA/EA is a copolymer formed from 95 weight percent acrylic acid (AA) and 5 weight percent ethyl acrylate (EA) having Mw 3000 and Mn 1700.

Table VIII illustrates that the preferred acrylic acid-hydrophobic copolymer of this invention is an effective dispersant for concentrated aqueous kaolin slurries.

While the method of this invention for controlling scale formation, precipitation inhibition, and the dispersion of inorganic materials has been described and exemplified in detail herein, various modifications, alterations, and changes should become readily apparent to those skilled in this art without departing from the spirit and scope of the invention. These modifications may include the blending of the acrylic acid copolymers described herein with other conventional additives to achieve additional benefits. For example, the acrylic acid copolymers may be blended with sulfonated styrene-maleic anhydride copolymers for improved iron dispersion, organic phosphonates for scale control, defoamers, biodispersants, corrosion inhibitors, and the like.

What is claimed is:

1. A method for dispersing inorganic particulate matter and inhibiting the formation of hardness ion salt scale in aqueous systems comprising adding an effective scale inhibiting and particulate dispersant amount of a water soluble, low molecular weight copolymer formed from about 85 to about 97 weight percent acrylic acid and from about 15 to about 3 weight percent of a hydrophobic comonomer selected from the group consisting of lower alkyl acrylates, having 2 to 8 carbon atoms in the alkyl group, and lower alkyl methacrylates, having 1 to 8 carbon atoms in the alkyl group to said aqueous systems, and where said copolymer has a weight average molecular weight of from about 2,000 to about 5,000.

2. The method of claim 1 where said comonomer is ethyl acrylate, and where said copolymer has a weight average molecular weight of about 2,500 to about 5,000.

3. The method of claim 2 where said copolymer is formed from about one unit of ethyl acrylate comonomer per unit of acrylic acid polymer chain, and where said copolymer has a weight average molecular weight of about 3,000.

4. The method of claim 1 where said aqueous system contains clay and said copolymer is formed from about 93 to 97 weight percent acrylic acid and from about 7 to about 3 weight percent of said hydrophobic comonomer, and where adding an effective amount of said copolymer disperses said clay in said aqueous system.

5. The method of claim 4 where said hydrophobic comonomer is ethyl acrylate, and where said copolymer has a weight average molecular weight of about 2500 to about 5000.

6. The method of claim 5 where said copolymer is formed from about one unit of ethyl acrylate comonomer per unit of acrylic acid polymer chain, and where said copolymer molecular weight is about 3000 weight average molecular weight.

7. A method for dispersing clay in aqueous systems comprising adding an effective dispersant amount of a water soluble, low molecular weight copolymer formed from about 95 weight percent acrylic acid and about 5 weight percent ethyl acrylate, where said copolymer contains about one unit of ethyl acrylate per unit of acrylic acid polymer chain and where said copolymer weight is about 3000 weight average molecular weight.

8. A method for dispersing a concentrated slurry of calcium carbonate comprising adding to said slurry an effective dispersant amount of a water soluble, low molecular weight copolymer formed from about 95 weight percent acrylic acid and about 5 weight percent ethyl acrylate and where said copolymer has a weight average molecular weight of about 3000.

9. The method of claim 8 where said slurry contains at least 75 weight percent calcium carbonate solids.

10. A method for dispersing a concentrated slurry of clay comprising adding to said slurry an effective dispersant amount of a water soluble, low molecular weight copolymer formed from about 95 weight percent acrylic acid and about 5 weight percent ethyl acrylate, and where said copolymer has a weight average molecular weight of about 3000.

11. The method of claim 10 where said slurry contains at least 70 weight percent kaolin clay solids.

* * * * *